United States Patent [19]
Dail

[11] Patent Number: 5,878,325
[45] Date of Patent: *Mar. 2, 1999

[54] HYBRID FIBER-COAX SYSTEM HAVING AT LEAST ONE DIGITAL FIBER NODE

[75] Inventor: James E. Dail, Marlboro, N.J.

[73] Assignee: AT&T Corp, Middletown, N.J.

[ * ] Notice: The term of this patent shall not extend beyond the expiration date of Pat. No. 5,864,748.

[21] Appl. No.: 678,836

[22] Filed: Jul. 12, 1996

[51] Int. Cl.$^6$ .................................................. H04N 7/173
[52] U.S. Cl. .............................................. 455/5.1; 348/12
[58] Field of Search ................................... 348/12, 13, 7, 348/10, 11; 455/5.1, 4.2; 359/124, 125; H04N 7/16

[56] References Cited
U.S. PATENT DOCUMENTS 5,499,047  3/1996  Terry et al. .................................. 348/6
5,528,582  6/1996  Bodeep et al. ............................. 348/12

*Primary Examiner*—Chris Grant
*Attorney, Agent, or Firm*—Robert B. Levy

[57] ABSTRACT

A shared hybrid fiber-coax transmission system (100) includes at least one fiber node (180) that includes at least one receiver (460) for converting an upstream signal into a baseband digital format for conversion into a digitally modulated, optically-formatted signal for transmission to a head end (120). By converting the upstream signal into a digital baseband format for transmission in an optical format to the head end, ingress nose associated with the upstream signal can be reduced.

4 Claims, 3 Drawing Sheets

HYBRID FIBER-COAX SYSTEM HAVING AT LEAST ONE DIGITAL FIBER NODE

BACKGROUND ART

This invention relates to a technique for reducing ingress noise in a share hybrid fiber-coax transmission system.

TECHNICAL FIELD

There now exist transmission systems that provide two-way transmission of information; e.g., video, audio, multimedia and/or data; between a head end and a plurality of subscribers. Typically, the head end transmits the information destined for individual subscribers ("downstream information") in an optical format, via one or more fiber optic links, to one or more fiber nodes. Each fiber node converts the optically-formatted downstream information into electrical signals for distribution, via a coaxial cable plant having a tree and branch architecture, to individual subscribers.

In addition to receiving the downstream information, each individual subscriber may generate information; in the form of voice, video, data, or any combination thereof, destined for the head end. The subscriber-generated information ("upstream information") is aggregated by the coaxial cable plant and passes to the fiber node for conversion into an optical format for transmission to the head end. The bandwidth (e.g., 5–40 MHz) associated with the upstream information is shared by all subscribers served by the same fiber node. Any noise and/or electrical interference (hereinafter, "noise") originating at an individual subscriber premises aggregates with the noise at the other subscriber premises, degrading the overall quality of the upstream information. The aggregation (summing) of the upstream information may simplify the overall transmission but results in a compromise in signal quality and bandwidth availability.

In my U.S. patent application Ser. No. 08/650,683, "Shared Hybrid fiber-Coax Network Having Reduced Ingress Noise," filed May 20, 1996, and assigned to AT&T Corp., (herein incorporated by reference), a hybrid fiber-coax transmission system is disclosed in which the upstream information is digitally regenerated within the coax distribution system to reduce ingress noise. In this way, the upstream information received at each fiber node is substantially noise free. However, present day fiber nodes typically convert the upstream information into an optical format via a linear electrical-to-optical converter. The linear electrical-to-optical converters used in present day hybrid fiber-coax networks have limited dynamic range and are influenced by the presence of noise and/or interference at their inputs. As a result, the upstream information transmitted back to the head end by each fiber node may still suffer an impairment in terms of signal quality and bandwidth availability.

Thus, there is a need for reducing the incidence of noise in a shared hybrid fiber-coax transmission system attributable to conversion of upstream information into an optical format for transmission to the head end.

BRIEF SUMMARY OF THE INVENTION

Briefly, in accordance with a preferred embodiment of the invention, ingress noise in a shared hybrid fiber-coax system in which upstream information is transmitted from the subscribers to the head end, can be reduced by regenerating the subscriber-generated upstream information through uplink regenerators, as taught in my copending patent application Ser. No. 08/650,683 (incorporated by reference herein). However, at the fiber node, the upstream signal, previously digitized by the regenerator, is not reconverted to an analog signal. Instead, the digital received signal is transmitted in a digital baseband, optical format across an optical fiber to the head end.

In comparison to modulating the upstream by analog techniques at the Fiber Node, as taught by the prior art, digital modulation affords several advantages. First, digital electrical-to-optical converters for accomplishing digital modulation are less expensive than their analog counterparts. Additionally, digital modulation provides a more robust signal quality. Moreover, use of such modulation techniques as Wavelength Division Multiplexing permits digitally modulated optically-formatted signals to share a common optical fiber link with signals that are modulated by analog techniques.

DETAILED DESCRIPTION

Figure 1:
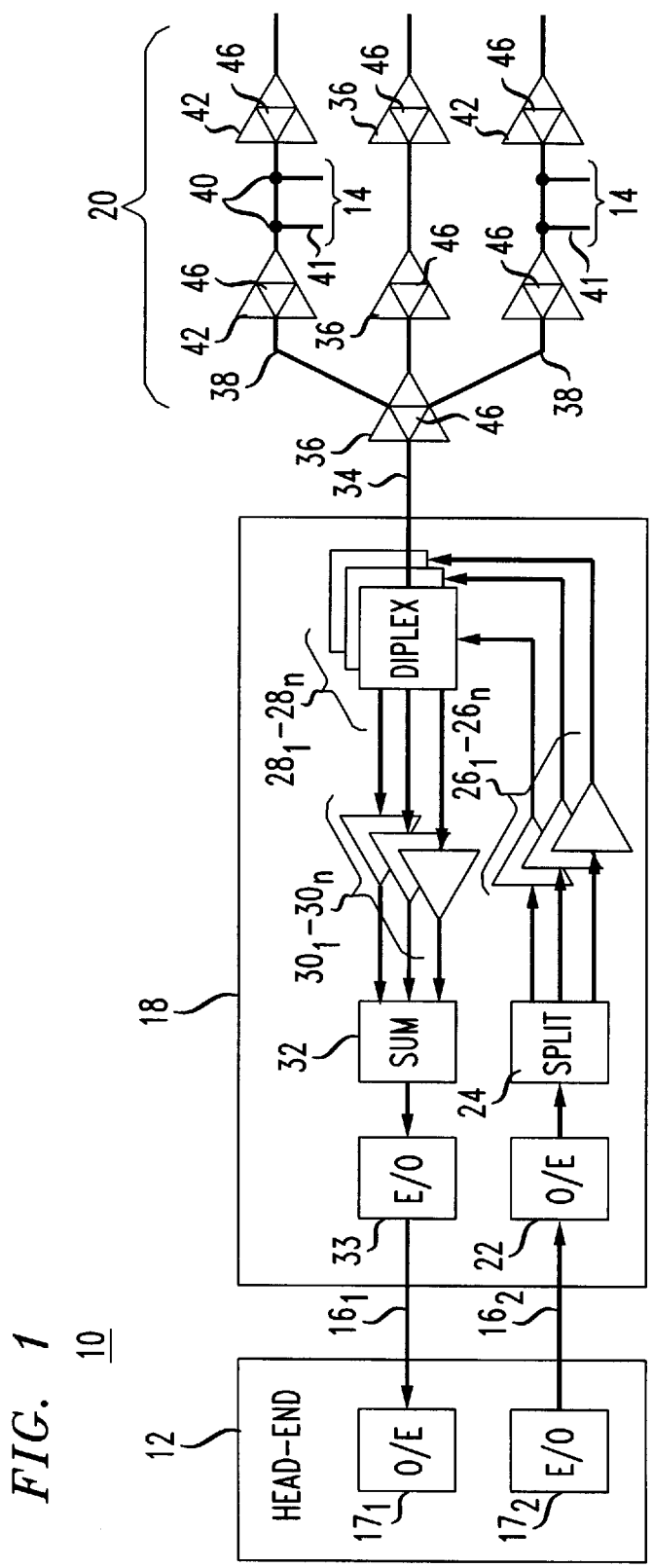
FIG. 1 is a block schematic diagram of a hybrid fiber-coax transmission system in accordance with the prior art.

FIG. 1 depicts a hybrid fiber-coax transmission system 10 in accordance with the prior art. The system 10 includes a head end 12 for generating information; e.g., video, audio, multimedia and/or data ("downstream information"); for transmission to individual subscribers 14—14. The head end also receives information, ("upstream information"); e.g., video, audio, multimedia and/or data; generated by one or more of the subscribers 14—14.

In practice, a combination of optical fibers and coaxial cables carry the downstream information from the head end to the subscribers 14—14 and carry the upstream information from the subscribers to the head end. As seen in FIG. 1, an optical upstream fiber $16_1$ carries upstream information in optical format between the head end 12 and a fiber node 18. At the head end, an optical-to-electrical (O/E) converter $17_1$ converts the optically formatted information upstream information into electrical signals for subsequent processing. An electrical-to-optical (E/O) converter $17_2$ within the head end 12 optically formats downstream information for transmission via a downstream fiber $16_2$ to the fiber node 18.

The fiber node 18 according to the prior art typically includes an O/E converter 22 for converting the optically-formatted downstream information, received via the fiber link $16_2$, into downstream electrical signals. A splitter 24 splits the downstream electrical signals produced by the O/E converter 22 into n downstream sub-signals (where n is an integer). Each of amplifiers $26_1$–$26_n$, amplifies a separate one of the n downstream sub-signals from the O/E converter 22 before supplying a corresponding sub signal to a separate one of diplexers $28_1$–$28_n$. Each of the diplexers $28_1$–$28_n$ functions to supply to the coaxial cable distribution plant 20 with a separate one of the n downstream sub-signals and to strip-off a separate one of n upstream signals received from the coaxial distribution plant 20.

The n upstream signals separated by diplexers $28_1$–$28_n$ are each individually amplified by a separate one of amplifiers $30_1$–$30_n$. A summer 32 sums the individual signals amplified by a separate one of the amplifiers $30_1$–$30_n$ to yield a composite signal that is converted into an optical format that is analog modulated via an electrical-to-optical (E/O) converter 33 having a linear transmitter (not shown). The analog modulated, optically-formatted signal produced by the E/O converter 33 passes via the optical fiber link $16_1$ to the head end 12.

The coaxial cable distribution network 20 that carries downstream information to each of the subscribers 14—14 and that carries upstream information from the subscribers to the fiber node 18, typically comprises at least one, and as many as n main coaxial cable trunks 34—34 (only one shown). In practice, n is three or four. Typically, one or more trunk amplifiers 36—36 are disposed along each main trunk 34 for amplifying the upstream and downstream information and for connecting signals to and from coax cable branches 38—38. In this way, the main trunk 34 supplies downstream information to, and receives upstream information from, one of more of the coaxial cable branches 38—38. Each branch 38 has one or more taps 40—40 connected to one or more individual subscribers 14—14 via feeders 41—41. One or more branch amplifiers (line extenders) 42—42 may be disposed along each branch 38 to amplify the upstream and downstream information along each branch.

Figure 2:
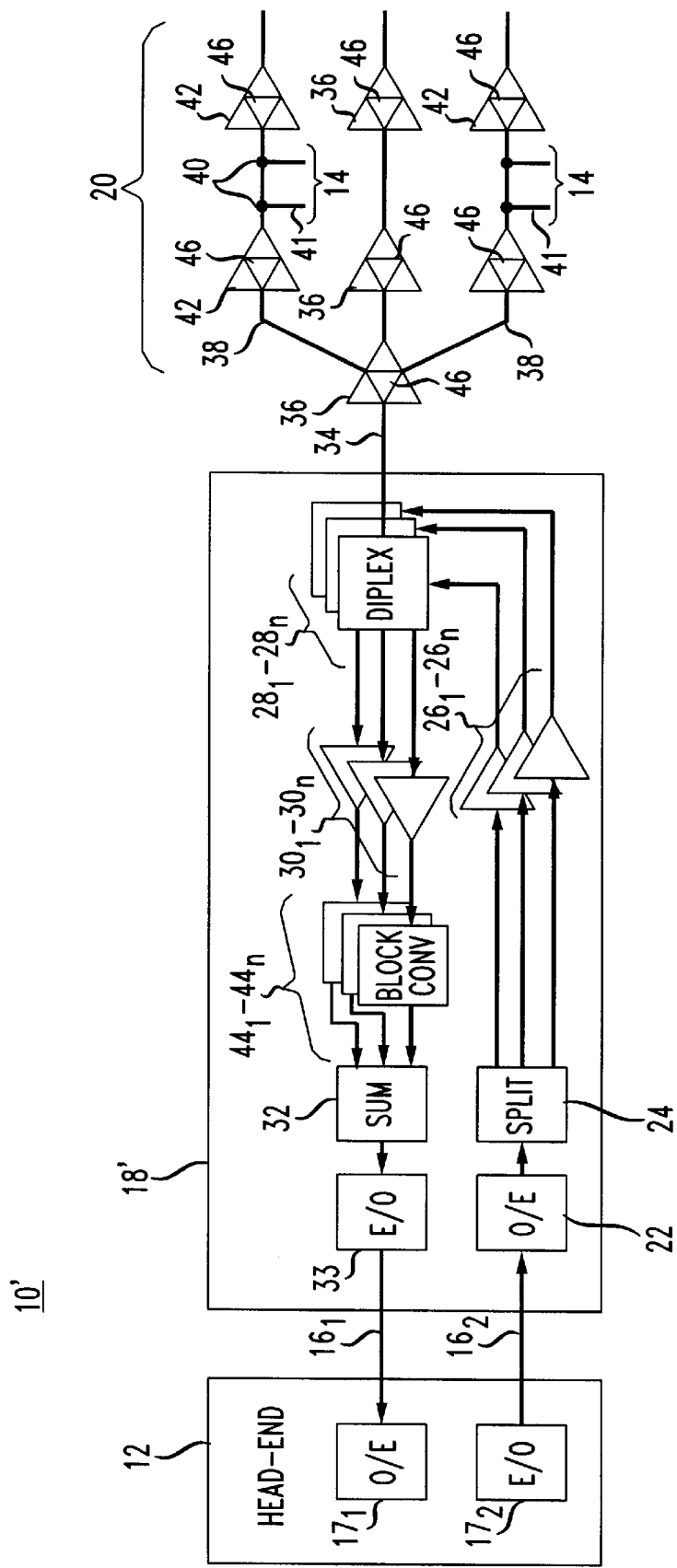
FIG. 2 is a block schematic diagram of a modified fiber node for use in place of the fiber node within the hybrid fiber-coax system of FIG. 1.

FIG. 2 depicts a modified fiber node 18' that is similar in many respects to the fiber node 18 of FIG. 1. Like numbers have been used to describe like elements. The fiber node 18' of FIG. 2 differs from that of FIG. 1 by virtue of the inclusion of a set of block converters $44_1$–$44_n$, each interposed between a separate one of the amplifiers $30_1$–$30_n$, respectively, and the summer 32. Each of the block converters $44_1$–$44_n$ functions to shift each upstream signal received from its corresponding one of amplifiers $30_1$–$30_n$ to different and non-overlapping frequency bands to reduce interference and noise aggregation. In this way more bandwidth may be provided to each of the subscribers $14_1$–$14_n$. To date, block conversion has not been widely deployed because of the cost associated with the block converters $44_1$–$44_n$ and the limited use of such frequency-shifted upstream channels in existing cable television systems.

The fiber-coax system 10, even as modified by the substitution of the fiber node 18' of FIG. 2 in place of the fiber node 18 of FIG. 1, suffers from the disadvantage that any noise associated with the upstream information generated by an individual one of the subscribers 14—14 aggregates with the noise from other subscribers. As discussed in my aforementioned U.S. patent application Ser. No. 08/650,683 (incorporated by reference herein), ingress noise can be reduced by digitally regenerating the upstream information within the coaxial cable distribution network 20 of FIGS. 1 and 2. To that end, a digital regenerator 46 may be provided within, or proximate to, one or more of the trunk amplifiers 36—36 for digitizing and digitally regenerating the subscriber-generated upstream information. If necessary, a regenerator 46 may be provided within one or more of the line extenders 42—42 of FIGS. 1 and 2 as well.

Despite the presence of the digital regenerators 46—46, the prior art hybrid coax system of FIG. 1, even as modified in FIG. 2, still suffers from the disadvantage that the E/O converter 33 within each of the Fiber Nodes 18 and 18' is linear, and operates to modulate the optically-formatted upstream information in an analog manner. This type of converter is expensive, and has a limited range. Moreover, any noise at the input to the E/O converter 33 may adversely affect its operation.

Figure 3:
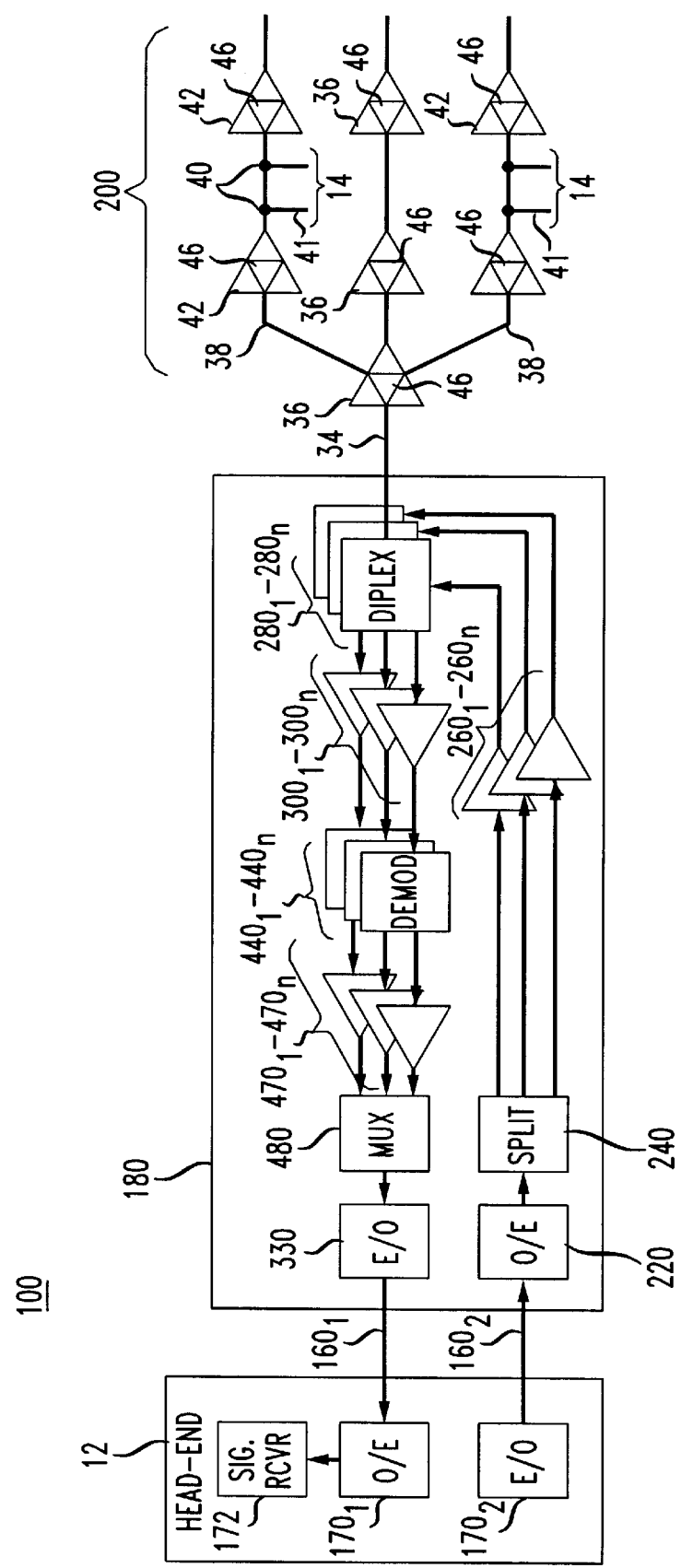
FIG. 3 is a block schematic diagram of a hybrid fiber-coax system in accordance with the teachings of the invention.

Referring to FIG. 3, there is shown a hybrid fiber-coax system 100 in accordance with the invention that overcomes the aforementioned disadvantages. Like the hybrid fiber-coax system 10 of FIG. 1, the hybrid fiber-coax system 100 of FIG. 3 includes a head end 120 and a coaxial cable distribution network 200. The coaxial cable distribution network 200 is identical to the network 20 of FIG. 1 so like numbers have been used to describe like elements therein. Thus, for example, the coaxial cable distribution network 200 may include one or more regenerators 46—46, as taught in my copending U.S. patent application Ser. No. 08/650, 683.

Like the head end 12 of FIGS. 1 and 2 which includes an E/O converter $17_2$, the head end 120 includes an E/O converter $170_2$. However, the head end 120 differs from the head end 12 of FIGS. 1 and 2 in the following respects. First, the head end 120 includes a digital O/E converter $170_1$ rather than the analog O/E converter $17_1$ as in the head end 12 in FIGS. 1 and 2. Further, the head end 120 of FIG. 3 includes a signal receiver 172 for performing level detection, as well as burst and timing detection, of the digital baseband signals received from the fiber node 180 in the manner described below.

As discussed, the hybrid fiber-coax system 10 of FIG. 1 includes a fiber node 18 optically formats the upstream information via analog modulation. In contrast, the hybrid fiber-coax system 100 of FIG. 3 includes a fiber node 180 that serves to digitize and demodulate the upstream information received via the coax trunks 34—34 into a digital baseband format for multiplexing and subsequent transmission to the head end 120. To accomplish transmission of the upstream information in a digital baseband format, the fiber node 180 includes a plurality of diplexers $280_1$–$280_n$ that functionally identically to the diplexers $28_1$–$28_n$ of FIGS. 1 and 2 for separating downstream information destined for the subscribers 14—14 from upstream information generated by the subscribers and destined for the head end 120. The individual upstream signals separated by each of the diplexers $280_1$–$280_n$ are amplified by a separate one of amplifiers $300_1$–$300_n$, each similar to one of amplifiers $30_1$–$30_n$ of FIG. 1.

The individual upstream signals amplified each of the amplifiers $300_1$–$300_n$ are frequency demodulated from their assigned upstream channels by a separate one of demodulators $460_1$–$460_n$. In practice, the demodulators $460_1$–$460_n$ demodulate the upstream signals within a particular frequency band, typically a 2–6 MHz bandwidth corresponding to a local digital channel. The demodulated upstream signals provided by the demodulators $460_1$–$460_n$ are input to a separate one of digital receivers $470_1$–$470_n$ respectively. Each of the receivers $470_1$–$470_n$ receives a corresponding demodulated signal and performs the following functions: (1) burst and level detection (i.e., detecting the existence and the level of the subscriber-generated signals): (2) clock recovery (recovering the clock signals associated with the subscriber generated signals); (3) preamble detection (detecting the specific synchronization portion of the subscriber-generated signals); and (4) data recovery (recovering the data portion of the subscriber-generated information), in order to convert the upstream into a baseband digital format. Typically, the receivers $470_1$–$470_n$ may be of the Quadrature Phase Shift Key (QPSK) type described in my aforementioned copending application Ser. No. 08/650,683. For a more detailed description of the receivers, reference should be had to that application.

A digital multiplexer 480 multiplexes the individual baseband digital signals produced by the receivers $470_1$–$470_n$ to yield a single baseband digital signal converted by a digital E/O converter 330 into an optical format that is digitally modulated for transmission on the optical fiber link $16_1$ for receipt at the head end. (Note that in the event that only a single digital baseband signal was present, the multiplexer 480 could be eliminated, and such a single signal would pass directly to the E/O converter 330.)

As compared to the linear E/O 33 converter employed by the fiber nodes 18 and 18' of FIGS. 1 and 2, respectively, the digital E/O converter 330 of FIG. 3 offers several advantages. First, by digitally modulating the upstream signals, the digital E/O converter 330 reduces influence of noise at its input, in contrast to the analog E/O converter 33 which, as discussed, is subject to noise. Secondly, the digital E/O converter 330 is less expensive, reducing the overall cost of each fiber node 180, a distinct advantage. Moreover, similar to the linear E/O 33 of FIGS. 1 and 2, the digital modulation provided by the E/O converter 330 permits the use of various digital multiplexing techniques, such as Wavelength division multiplexing, or similar techniques, to permit the digitally modulated optically-formatted signals to share a the fiber link 160 in common with analog modulated optically-formatted signals.

Lastly, the fiber node 180 also includes an O/E converter 220, which like the O/E converter 22 of FIG. 1, converts the optically-formatted downstream information received from the head end 120 into electrical signals. These signals are split by a splitter 240 and amplified by amplifiers $260_1$–$260_n$ for receipt at a separate one of the diplexers $280_1$–$280_n$ for transmission by the coaxial cable distribution network 20 to the subscribers 14—14.

The foregoing describes a shared hybrid fiber-coax system that includes a fiber node that transmits to a head end, in a baseband digital format, upstream information generated by individuals subscribers to reduce the incidence of upstream noise.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for reducing aggregated ingress noise in a hybrid fiber-coax transmission system that carries information form a head end to a plurality of subscribers via at least one main coax trunk and for carrying information originated by said plurality of subscribers to said head at least in part on said main coax trunk, comprising the steps of:

aggregating onto the main coax trunk information generated by said plurality of subscribers digitally regenerating the aggregated upstream signals for transmission on the main coax trunk to a fiber node; and optically formatting, at said fiber node, the digitally-regenerated aggregated upstream signals modulated onto the high frequency band in baseband digital format for transmission to a head end.

2. The method according to claim 1 wherein the optically formatted signals transmitted in baseband digital format are multiplexed with other signals on an optical fiber by Wavelength Division Multiplexing.

3. The method according to claim 1 wherein the upstream signals may include: video, audio, multimedia and/or data.

4. A method of operating a shared hybrid fiber-coax transmission system in which a downstream signal is destined for transmission from a head end to individual subscribers and in which upstream signals are generated by subscribers for transmission to the head end, the method comprising the steps of:

transmitting the downstream signal in an optical format from the head end to a fiber node for conversion to a downstream electrical signal;

transmitting the downstream electrical signal, via a coaxial cable plant, to the individual subscribers;

aggregating, in the coaxial cable plant, upstream signals generated by the subscribers;

digitally regenerating, within the coaxial cable the aggregated upstream signals;

transmitting the digitally regenerated upstream signals via the coax plant to the fiber node; and optically formatting, at the fiber node, the digitally regenerated aggregated upstream signals into a baseband digital format for transmission from the fiber node to the head end.

\* \* \* \* \*